US008863227B2

(12) United States Patent
Zhang et al.

(10) Patent No.: US 8,863,227 B2
(45) Date of Patent: Oct. 14, 2014

(54) METHOD AND APPARATUS TO CREATE AND MANAGE A DIFFERENTIATED SECURITY FRAMEWORK FOR CONTENT ORIENTED NETWORKS

(75) Inventors: Xinwen Zhang, San Jose, CA (US); Ravishankar Ravindran, San Jose, CA (US); Guoqiang Wang, Santa Clara, CA (US); Guangyu Shi, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 22 days.

(21) Appl. No.: 13/226,605

(22) Filed: Sep. 7, 2011

(65) Prior Publication Data

US 2012/0174181 A1 Jul. 5, 2012

Related U.S. Application Data

(60) Provisional application No. 61/429,827, filed on Jan. 5, 2011.

(51) Int. Cl.
| | |
|---|---|
| *H04L 29/06* | (2006.01) |
| *G06F 21/10* | (2013.01) |
| *H04L 9/08* | (2006.01) |
| *H04L 9/32* | (2006.01) |

(52) U.S. Cl.
CPC .............. *G06F 21/10* (2013.01); *H04L 9/0833* (2013.01); *H04L 9/3247* (2013.01); *H04L 63/104* (2013.01); *H04L 63/123* (2013.01); *H04L 2209/60* (2013.01); *G06F 2221/2141* (2013.01)
USPC ............ 726/1; 726/2; 726/3; 726/4; 713/171; 713/176; 713/193

(58) Field of Classification Search
USPC .............. 726/1, 2–6, 11–15, 27–30; 713/171, 713/176, 193
See application file for complete search history.

(56) References Cited

U.S. PATENT DOCUMENTS 6,968,389 B1 * 11/2005 Menditto et al. ............... 709/233
6,981,029 B1 * 12/2005 Menditto et al. ............... 709/217
(Continued)

FOREIGN PATENT DOCUMENTS

| CN | 1489069 A | 4/2002 |
|---|---|---|
| EP | 2120419 A2 | 11/2009 |

(Continued)

OTHER PUBLICATIONS

Choi, Jaeyoung, et al. "A survey on content-oriented networking for efficient content delivery." Communications Magazine, IEEE 49.3 (2011): 121-127.*
Ghodsi, Ali, et al. "Naming in content-oriented architectures." Proceedings of the ACM SIGCOMM workshop on Information-centric networking. ACM, 2011: 1-6.*

(Continued)

*Primary Examiner* — Luu Pham
*Assistant Examiner* — Kari Schmidt
(74) *Attorney, Agent, or Firm* — Conley Rose, P.C.; Grant Rodolph; Brandt D. Howell (57) ABSTRACT

A network component comprising a receiver configured to receive a signed content item and an associated security information from a publisher, wherein the security information indicates which group from a plurality of groups is allowed to access the signed content item, a storage unit configured to cache the content item and the associated security information, a processor to implement procedures to enforce security policies defined by the security information, and a transmitter configured to send the signed content item from the cache to a subscriber when the subscriber is a member of a group indicated by the security information as authorized to access the signed content item.

17 Claims, 9 Drawing Sheets

(56) References Cited

U.S. PATENT DOCUMENTS

| | | | |
|---|---|---|---|
| 7,502,836 B1* | 3/2009 | Menditto et al. | 709/217 |
| 7,656,885 B2* | 2/2010 | Tam et al. | 370/401 |
| 7,882,035 B2* | 2/2011 | Cottrille et al. | 705/59 |
| 8,301,778 B2* | 10/2012 | Richardson et al. | 709/226 |
| 2003/0161335 A1* | 8/2003 | Fransdonk | 370/401 |
| 2003/0167392 A1* | 9/2003 | Fransdonk | 713/156 |
| 2005/0201392 A1* | 9/2005 | Tam et al. | 370/401 |
| 2007/0171924 A1* | 7/2007 | Eisner et al. | 370/401 |
| 2008/0154903 A1 | 6/2008 | Crowley et al. | |
| 2008/0285475 A1* | 11/2008 | Menditto | 370/252 |
| 2009/0235347 A1 | 9/2009 | Syed et al. | |
| 2009/0287835 A1* | 11/2009 | Jacobson | 709/229 |
| 2010/0228972 A1* | 9/2010 | Wat et al. | 713/163 |
| 2012/0005371 A1* | 1/2012 | Ravindran et al. | 709/242 |
| 2012/0144210 A1* | 6/2012 | Yacobi | 713/193 |
| 2012/0159176 A1* | 6/2012 | Ravindran et al. | 713/176 |
| 2012/0166806 A1* | 6/2012 | Zhang et al. | 713/176 |
| 2012/0260094 A1* | 10/2012 | Asim et al. | 713/171 |

FOREIGN PATENT DOCUMENTS

| | | | | |
|---|---|---|---|---|
| WO | WO 2011/073894 | * | 6/2011 | G06F 21/00 |
| WO | WO 2011/073894 A1 * | | 6/2011 | G06F 21/00 |

OTHER PUBLICATIONS

Zhang, Xinwen, et al. "Towards name-based trust and security for content-centric network." Network Protocols (ICNP), 2011 19th IEEE International Conference on. IEEE, 2011: 1-6.*

"Named Data Networking (NDN) Project," PARC Technical Report NDN-0001, Oct. 2010, http://named-data.org, 2 pages.

Bethencourt, et al., "Ciphertext-Policy Attribute-Based Encryption," http://www.cs.berkeley.edu/~bethenco/oakland07cpabe.pdf, 15 pages, 2007.

"Advanced Crypto Software Collection," http://acsc.cs.utexas.edu/, 3 pages, retrieved on Sep. 6, 2011.

Foreign Communication from a Related Application, European Application No. EP 12 73 2262, Extended European Search Report dated Nov. 29, 2013, 6 pages.

Foreign Communication from a Related Application, PCT Application No. PCT/CN2012/070060, International Search Report dated Apr. 12, 2012, 11 pages.

Jacobson, V., et al., "Networking Named Content", ACM CoNEXT, Dec. 1-4, 2009, Rome, Italy, 12 pages.

Krishnan, R., et al., "Policy-Agile Encrypted Networks Via Secure Function Computation", The 2010 Military Communications Conference, Dec. 31, 2010, 6 pages.

* cited by examiner

METHOD AND APPARATUS TO CREATE AND MANAGE A DIFFERENTIATED SECURITY FRAMEWORK FOR CONTENT ORIENTED NETWORKS

CROSS-REFERENCE TO RELATED APPLICATIONS

The present application claims the benefit of U.S. Provisional Patent Application No. 61/429,827 filed Jan. 5, 2011 by Xinwen Zhang et al. and entitled "Method and Apparatus to Create and Manage Differentiated Security Framework for Content Oriented Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a content oriented network (CON), a content router is responsible for routing user requests and content to proper recipients. In the CON, a domain-wide unique name is assigned to each entity that is part of a content delivery framework. The entities may comprise data content, such as video clips or web pages, and/or infrastructure elements, such as routers, switches, or servers. The content router uses name prefixes, which can be full content names or proper prefixes of content names instead of network addresses, to route content packets within the content network.

SUMMARY

In one embodiment, the disclosure includes a network component comprising a receiver configured to receive a signed content item and an associated security information from a publisher, wherein the security information indicates which group from a plurality of groups is allowed to access the signed content item, a storage unit configured to cache the content item and the associated security information, a processor to implement procedures to enforce security policies defined by the security information, and a transmitter configured to send the signed content item from the cache to a subscriber when the subscriber is a member of a group indicated by the security information as authorized to access the signed content item, wherein the subscriber verifies the signed content.

In another embodiment, the disclosure includes a content router comprising storage configured to store a signed content item and an associated security policy, wherein the signed content item is received from a first one of a plurality of users in a content oriented network (CON), wherein the security policy indicates which group's members from a plurality of groups is allowed to access the signed content item, and a processor configured to enforce the associated security policy for the signed content item.

In another embodiment, the disclosure includes a system for enforcing a plurality of security policies for shared content, comprising a content oriented network (CON) comprising a plurality of content routers, and a plurality of edge nodes coupled to the CON, wherein the edge nodes are configured to couple a first group of users to the CON and a second group of users to the CON, wherein the first group of users are associated with a first security policy for a first content item, wherein the first security policy is created by the first group of users, and wherein the second group of users are associated with a second security policy for a second content item, wherein the second security policy is created by the second group of users, wherein the first security policy is different from the second security policy, and wherein the CON is configured to implement the first security policy and the second security policy.

In another embodiment, the disclosure includes a network apparatus implemented method, comprising receiving, at a receiver, a publisher signed content item from a publisher, encrypting, with a processor, the publisher signed content item, storing the encrypted publisher signed content item in a storage, and enforcing, with a processor, a publisher defined security policy to provide security to the encrypted publisher signed content item These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In CONs, content delivery, including publishing, requesting, managing (e.g., modification, deletion, etc.) is based on content name. One aspect of CONs that may be different from traditional Internet Protocol (IP) networks is the ability of CONs to interconnect multiple geographical points and cache content temporarily or on a more persistent basis. This may allow content to be served from the network instead of an originating server, and thus may substantially improve user experience. The caching feature of a CON may have some implications to the user in terms of performance, security, and/or reliability of handled data. Such implications may depend on service level agreements (SLAs) between the CON and the user. For instance, the user may entrust the CON to manage all its data, which may include strict SLA requirements. Such SLA requirements may require service differentiation in the context of content delivery with respect to performance, security, and/or reliability. Alternatively, the CON may only provide a best effort content dissemination service by first prioritizing its preferred user.

Disclosed herein is a system and method for providing security level service differentiation among the users of a CON. The system and method may create and manage different security levels for different users or user classes in the CON. The provided security level service differentiation may span multiple security aspects, such as privacy of published data, integrity of permanent or cached data, e.g., to prevent malicious attacks within or outside the network, issues related to trust management, and/or other security aspects. The security differentiation may address securing published data in terms of privacy and accessibility to other users.

Figure 1:
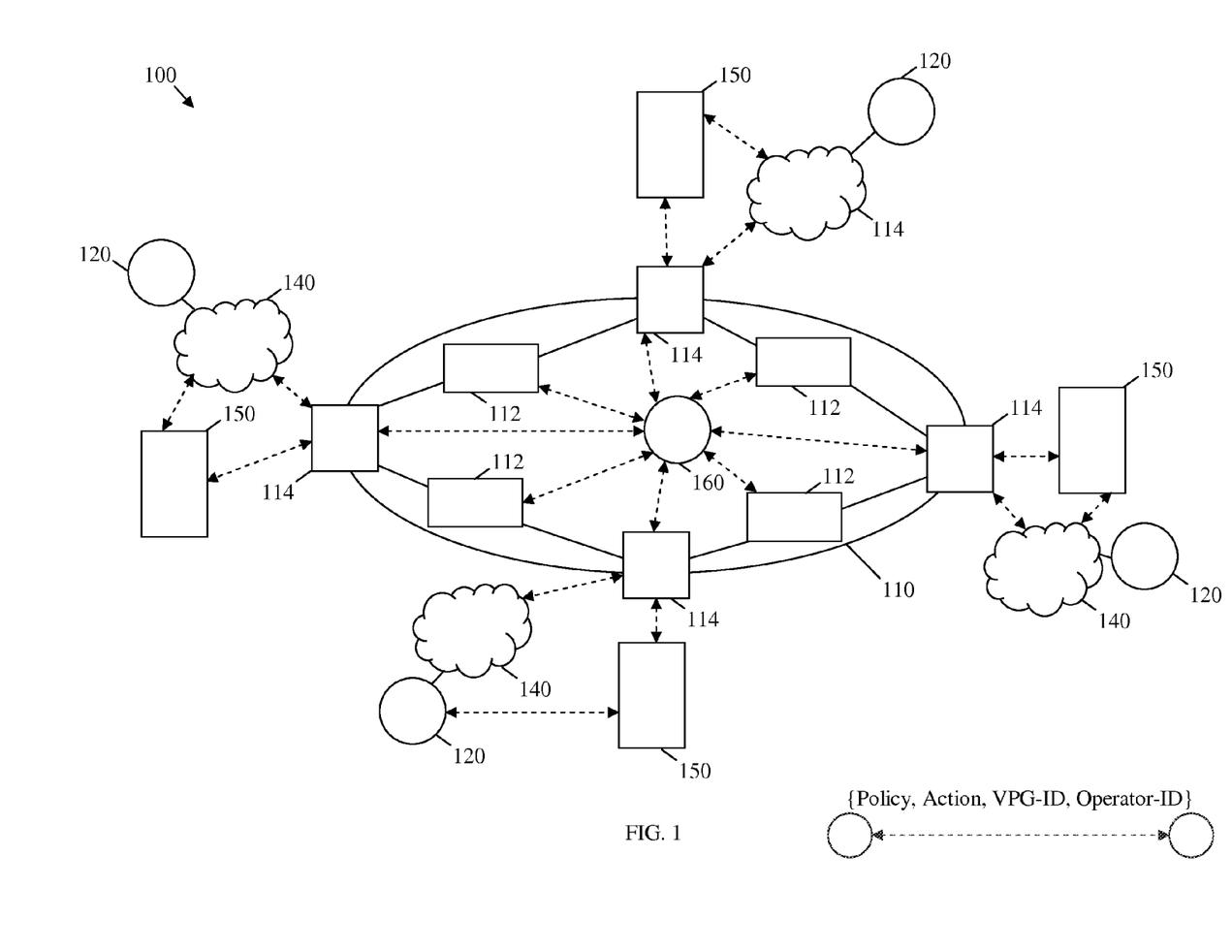
FIG. 1 is a schematic diagram of one embodiment of a CON.

FIG. 1 illustrates an embodiment of a CON 100, where content may be routed based on name prefixes and delivered to customers based on request. The CON 100 may comprise a network domain 110 that comprises a plurality of nodes, such as an IP domain, a Multiprotocol Label Switching (MPLS) domain, or an Ethernet domain. The network domain 110 may comprise a plurality of internal nodes 112 and a plurality of content routers 114, which may be coupled to each other via network links, e.g., fixed connections. The content routers 114 may be coupled to a plurality of customer nodes 120, via a plurality of access networks 140, and to a plurality of customer sites 150, as shown in FIG. 1. The CON 100 may also comprise a management plane 160 that may communicate with the internal nodes 112 and/or the content routers 114.

The internal nodes 112 may be any nodes, devices, or components that support transportation of traffic, e.g., frames and/or packets, through the CON 100. The internal nodes 112 may pass the traffic onto or receive the traffic from other nodes in the same network domain 110. For example, the internal nodes 112 may be routers, switches, or bridges, such as backbone core bridges (BCBs), provider core bridges (PCBs), or label switch routers (LSRs). The internal nodes 112 may also be content routers 114 that forward content based on content name prefixes. The content routers 114 may be any nodes, devices or components that support transportation of traffic between the network domain 110 and external components. The content routers 114 may be edge nodes that forward content traffic from the internal nodes 110 to the customer nodes 120 and/or the customer sites 150, e.g., based on a customer request or demand. The content routers 114 may also receive content requests from the customer nodes 120. For example, the content routers may be routers or bridges, such as backbone edge bridges (BEBs), provider edge bridges (PEBs), or label edge routers (LERs) that forward content based on content name prefixes. The internal nodes 112 and/or the content routers 114 may comprise or may be coupled to a plurality of content servers that store or cache content, which may be provided to customers or subscribers, e.g., upon demand.

The customer nodes 120 may be nodes, devices, or components configured to deliver content to a user or customer and receive content requests from the customer nodes 120. For instance, the customer nodes 120 may be fixed or mobile user-oriented devices, such as desktop computers, notebook computers, personal digital assistants (PDAs), or cellular telephones. Alternatively, the customer nodes 120 may be connectivity devices at customer premises, such as modems or set-top boxes. The customer nodes 120 may also comprise customer equipment (not shown) that may be configured to receive content from the content routers 114, via the access networks 140, and distribute the content to a plurality of customers. For instance, the customer nodes 120 may comprise optical network terminals (ONUs) and/or very high bit rate Digital Subscriber Line (VDSL) transceiver units at residential locations (VTU-Rs). The access networks 140 may be any networks that provide access to the content in the CON 100, such as Virtual Private Networks (VPNs). The customer sites 150 may be any sites or office environments configured to receive content from the content routers 114 and may send the content to corresponding customer nodes 120, via the access networks 140. The customer sites 150 may also receive content requests from the customer nodes 120 and send the content requests to the content routers 114.

The users or customers may be subscribers of the CON 100 or subscribers of another entity/community or user group (e.g., Enterprise, Social Network (SN)) that may be a customer of the CON 100. The User group may comprise a plurality of users that may publish (push) and/or subscribe (pull) content from the CON 100. If the users are subscribers of CON 100, the users may be categorized into multiple classes or categories (such as gold, silver, and bronze) and the CON 100 and/or the management plane 160 may implement a mechanism to provide stronger or enhanced security assurance for the users. If the users are subscribers of another entity/community or user group that is a customer of the CON 100, then the CON 100 and/or the management plane 160 may implement different mechanisms or schemes to provide different security levels for different user classes.

For instance, different user groups may have different SLAs, which may ensure a plurality of guarantees with respect to performance, reliability, availability, and/or security. The CON 100 may provide security services or functions for the different user groups. The content routers 114 may be aware of the different user groups for which the CON 100 provides security services. Specifically, the CON 100 or the management plane 160 may comprise a central authority that is aware of the user group instances within a content router 114 and may manage the user groups, which may allow installation, management, and content publishing/subscribing for each user group. The CON 100 and/or the management plane 160 may use unique global and local identification of the user groups to enable control/data plane related content dissemination functions for the user groups. The management plane 160 may use virtual private user group identifiers (VPG-IDs) and/or member identifiers (IDs) to be aware of the policy actions being mapped to the user groups. This information may be exchanged between the management plane 160, the content routers 114, the customer sites 150, and/or the customer nodes 120 (as indicated by the dashed arrow lines in FIG. 1).

In an embodiment, content sharing between multiple user groups may be enabled in the CON 100. For example, in the case where multiple user group instances are present in all the content routers 114, the meta data associated with a user's request for content may be used to resolve the content to its appropriate location in the CON 100 by applying the request against the user group identified by the content name. In another embodiment, only some of the user groups may be defined in a subset of content routers 114, e.g., due to scalability reasons. In this case, the central authority of the management plane 160 may have knowledge of the mapping between the user groups instances and the content routers 114.

In an embodiment, the CON 100 may use three modes of operation to ensure user privacy and data accessibility for the user groups and their users, which may be based on different SLA requirements. The first mode may be implemented when the user group (e.g., Enterprise or SN) handles content security. In this case, the user may interact with the user group to seek authorization to publish or request any content and the CON 100 may basically serve as a content dissemination engine. In the second mode, the user group (Enterprise or SN) and the CON may participate in ensuring privacy and accessibility of data that has been published. In this case the security responsibility may be divided between the user group and the CON 100. The third mode may be a CON complete solution where the CON 100 takes over the responsibility of providing security and preventing wrongful access to the published content, without substantial involvement from the user group.

The three modes above may be supported in the CON 100 using three confidentiality/privacy protection functions or schemes, which may be applied for different user groups or different user classes (categories), e.g., in the same or different user groups. In a first scheme, the security service may be limited to ensuring data integrity among the users of a user group or among all the user groups. In the second scheme, security features may be defined for each user in a user group or for each user group, which may enable more security than the first scheme. This scheme may include data confidentiality/privacy for ensuring that cached data is secure in the network. In the third scheme, security policies may be enabled so as to share the content among multiple user groups to preserve both data integrity and confidentiality/privacy for users. The third scheme may allow users in a user group to access and/or publish content or information in another user group or multiple user groups. The three schemes for the three modes are described in more detail below.

Figure 2:
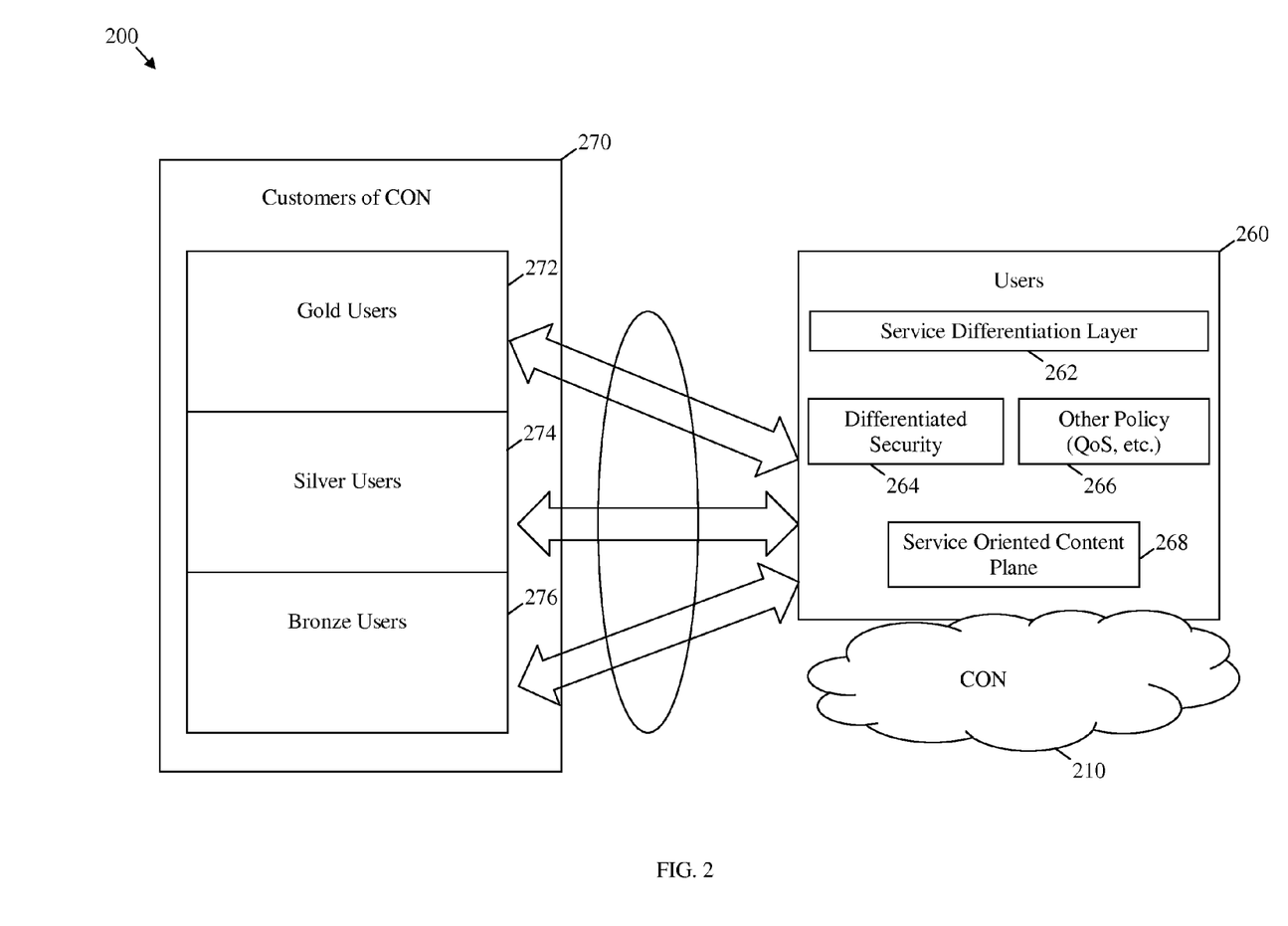
FIG. 2 is a schematic diagram of an embodiment of a CON architecture.

FIG. 2 illustrates an embodiment of a CON architecture 200 for providing security level service differentiation among the users of a CON. The CON architecture 200 may comprise a central authority for managing users 260 associated with a CON 210, which may be substantially similar to the CON 100. The central authority for managing users 260 may have knowledge of a plurality of user group instances (e.g., in the content routers) for a plurality of users 270 in one or more user groups. The users 270 or user groups may be classified into a plurality of service level users. For instance, three service level users may be classified: first level or bronze users 276, second level or silver users 274, and third level or gold users 272. The same user group may comprise users that belong to different classes or to only one of the classes. Different user groups may also belong to different classes or may share the same class.

The central authority for managing users 260 may comprise a service differentiation layer 262 for identifying the different user groups and users, such as based on VPG-IDs for the user groups and/or member IDs for the users 270, which may be indicated in the content of the users 270. The central authority for managing users 260 may comprise a differentiated security service 264, which may be implemented to the different user classes by a service oriented content plane 268, such as based on one of the three schemes above. For example, the first scheme may be used to provide data integrity to the bronze users 276. The second scheme may be implemented to provide data integrity and data confidentiality to the silver users 274. The data confidentiality may be based on security requirements or policies, such as SLAs for the users 270 or user groups. The service oriented content plane 268 may also use other policies 266, such as Quality of Service (QoS) or other policies for the users 270 or user groups. The third scheme may be implemented to provide data integrity and shared confidentiality among different user groups for the gold users 272, e.g., based on the other policies 266.

Figure 3:
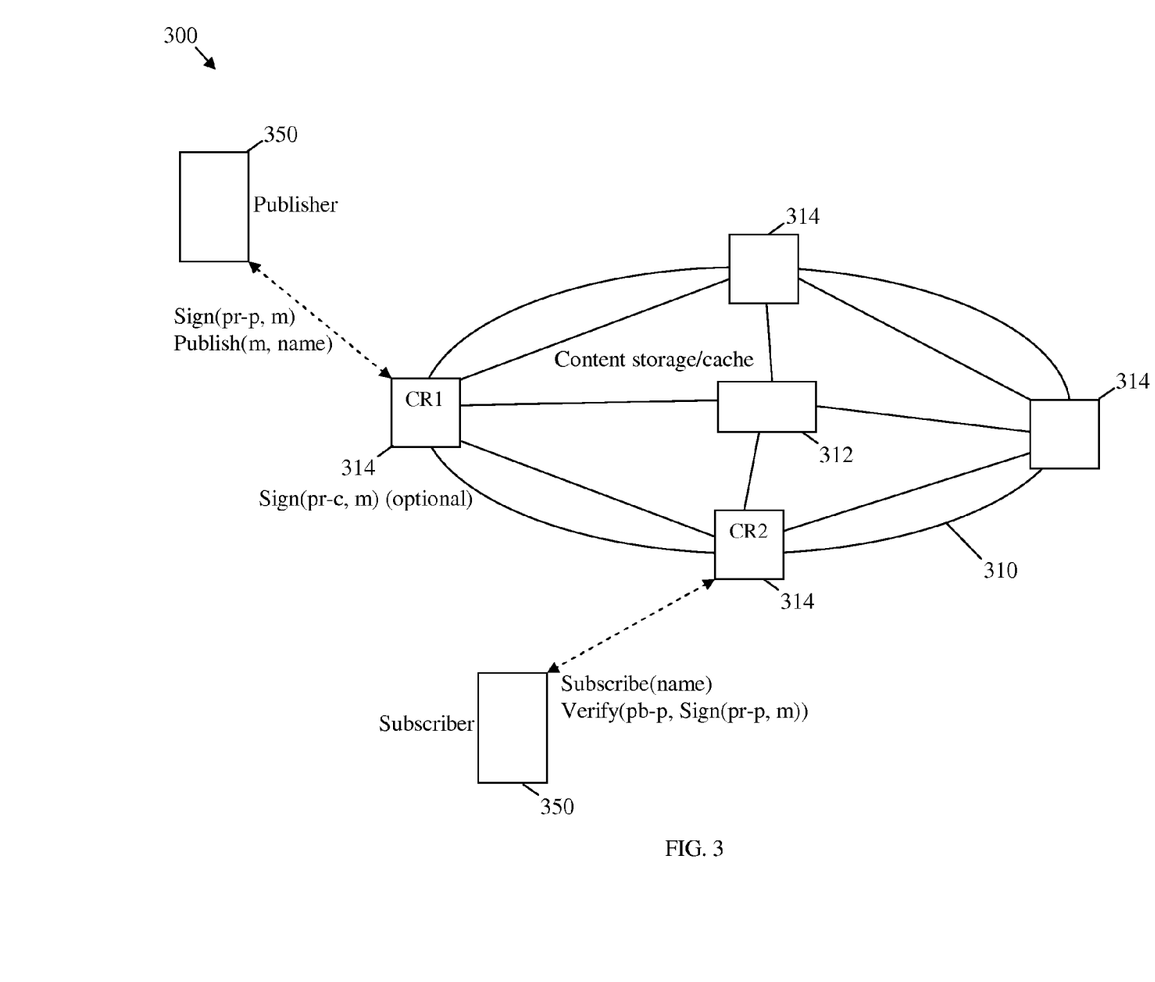
FIG. 3 is a schematic diagram of an embodiment of a first level security scheme.

FIG. 3 illustrates an embodiment of a first level security scheme 300 that may be used to provide data integrity to first level or default users, e.g., the bronze users 276. The first level security scheme 300 may be implemented in a CON 310 to provide basic security, such as in the first operation mode described above when a user group (e.g., Enterprise or organization) handles content security. The CON 310 may comprise a plurality of internal nodes 312 and content routers 314, which may be configured substantially similar to the internal nodes 112 and the content routers 114, respectively. The content routers 314 may be coupled to a plurality of customer nodes/sites 350, similar to the customer nodes 120/customer sites 150, e.g., via a plurality of access networks (not shown). The customer nodes/sites 350 may be configured to publish/subscribe content in the CON 310.

Based on the first level scheme 300, each user group may have a public/private key pair (pb-p, pr-p) and general cryptographic algorithms or functions. In some scenarios, each content router 314 may also have a public/private key pair (pb-c, pr-c). The cryptographic algorithms may include functions for signing content (Sign(pr, m)) and verifying content signature (Verify(pb, Sign(pr, m)). The functions may be based on the parameters public key (pb), private key (pr) and content (m). The cryptographic algorithms or functions may be any cryptographic algorithms or functions known or used in existing CONs, e.g., using algorithm libraries such as open Secure Sockets Layer (openSSL).

For instance, a first customer node/site 350 may be a content publisher that publishes content for a user to the CON 310, via a first content router 314 (CR1). The user may belong to a user group that is subscribed to or associated with the customer node/site 350, such as an Enterprise, organization, or SN. The user may sign content using Sign(pr-p, m) and publish the content with CR1 using Publish(m, name), where pr-p is a private key for the publisher (e.g., the first customer node/site 350) and name is the content name (e.g., name prefix). The content may be signed by the private key to provide a digital signature on the content. CR1 may optionally also sign the published content using Sign(pr-c, m), where pr-c is a private key for the content router 314. The content may then be stored or cached in the CON 310.

A second customer node/site 350, which may correspond to the same user group or a different user group of the first customer node/site 350, may then obtain the content. The second customer node/site 350 may subscribe the content with CR1 or with a second content router 314 (CR2) using Subscribe(name). The first level scheme 300 may allow the second customer nodes/site 350 to verify the integrity of the content by examining the digital signature of the first customer node/site 350 and/or CR1 using Verify(pb-p, Sign(pr-p, m)), where pb-p is a public key for publishers. In some scenarios, CR2 may also verify any unwanted tampering of the data (e.g., while cached in the CON 310) using an optional signature computed by the CR1 servicing the publisher. Thus, the second customer node/site 350 may determine that the content is provided by a publisher of the CON 310 and not by an intruder or unauthorized entity. For instance, each content router 314 may have a corresponding public/private key pair (pb-c, pr-c), which may be distributed in the CON 310 using network management functions. In some scenarios, the subscriber may also verify the integrity of the content signed by CR1 using Verify(pb-c, Sign(pr-c, m)). Additionally, CR2c may verify the content using Verify(pb-p, Sign(pr-p, m)) or Verify(pb-c, Sign(pr-c, m)), since pb-p and pb-c may be publicly available to all entities (users and routers) of the CON 310.

The functions for content publishing and subscribing may be provided, e.g., as application programming interfaces (APIs), by the CON 310 to the customer nodes/sites 350. By providing signature verification, the first level scheme 300 may allow users basic security by verifying content integrity of pulled or subscribed content. However, the first level scheme 300 may not provide content confidentiality/privacy protection to the users (e.g., publishers/subscribers). Thus, threats of passive eavesdropping during content transmission and/or of access from unauthorized subscribers may still exist.

Figure 4:
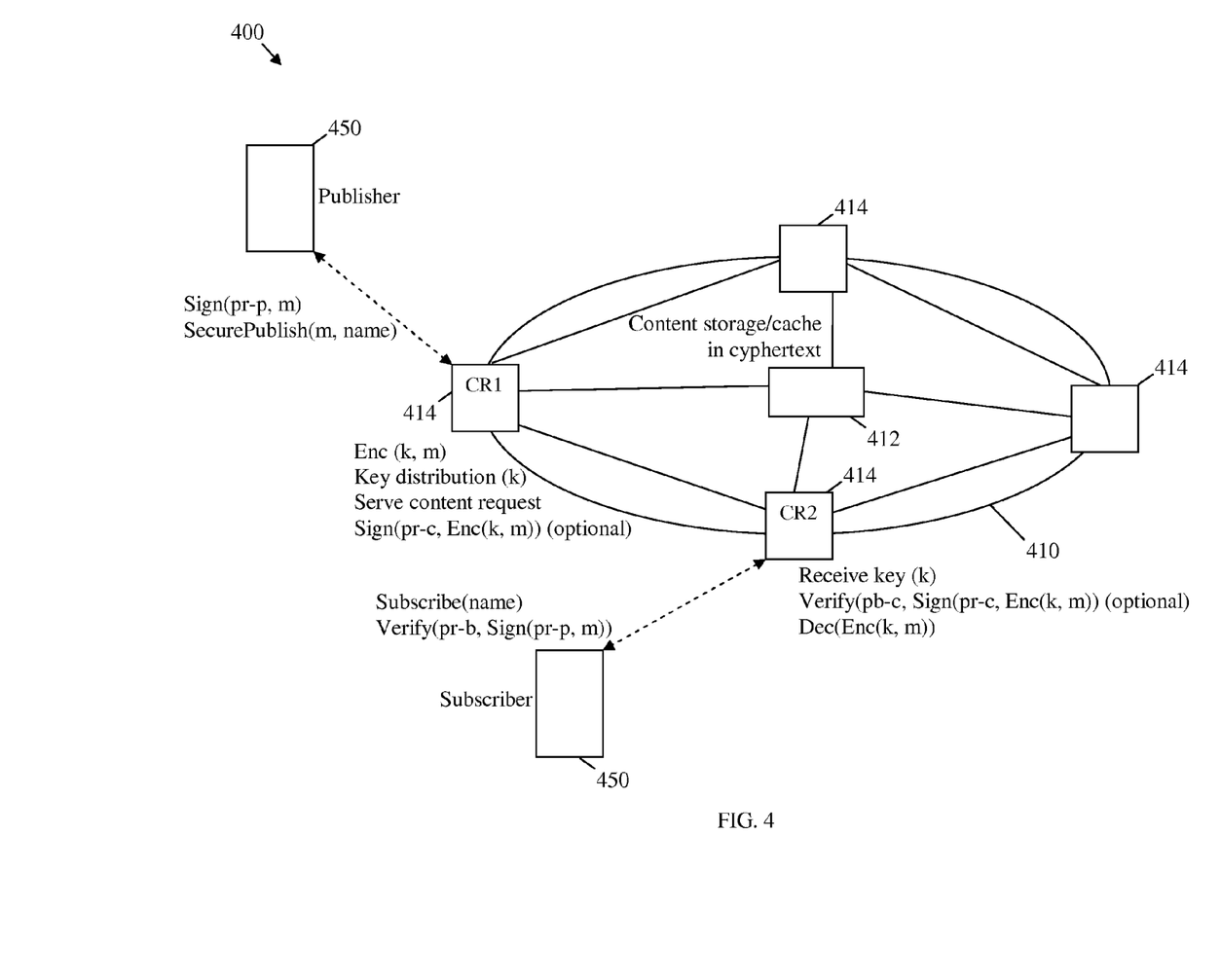
FIG. 4 is a schematic diagram of an embodiment of a second level security scheme.

FIG. 4 illustrates an embodiment of a second level security scheme 400 that may be used to provide data integrity and content confidentiality/privacy to second level users, e.g., the silver users 274. The second level security scheme 400 may be implemented in a CON 410 to provide more security than the first level security scheme 300, such as in the second mode of operation described above when the CON 410 participates in ensuring privacy and accessibility of published content. Specifically, the second level security scheme 400 may provide users content integrity verification, as the first level security scheme 300, and additionally content confidentiality/privacy protection by allowing content encryption/decryption. The CON 410 may comprise a plurality of nodes 412 and content routers 414, which may be configured substantially similar to the internal nodes 412 and the content routers 414, respectively. The content routers 414 may be coupled to a plurality of customer nodes/sites 450, similar to the customer nodes 120/customer sites 150, e.g., via a plurality of access networks (not shown). The customer nodes/sites 450 may be configured to publish/subscribe content in the CON 410.

Based on the second level scheme 400, one or more of user groups may have a public/private key pair and general cryptographic algorithms or functions, as in the first level security scheme 300. The cryptographic algorithms or functions may include functions for signing content (Sign(pr, m)) and verifying content signature (Verify(pb, Sign(pr, m), which may be provided via algorithm libraries such as openSSL. At least some of the routers may have encryption keys and general cryptographic algorithms or functions, including content encryption (Enc(k, m) and content decryption (Dec(k, Enc(k, m)), For instance, a first customer node/site 450 may be a content publisher that publishes content for a user to the CON 410, via a first content router 414 (CR1). The user may belong to a user group that is subscribed to or associated with the customer node/site 450, such as an Enterprise, organization, or SN. The user may sign content using Sign(pr-p, m) and publish the content with CR1 using SecurePublish(m, name). The content may be published in original format, e.g., as plaintext. As such, CR1 may encrypt the content, e.g. in cyphertext format, using Enc(k, m) to protect content confidentiality and user privacy. The encryption key k may be selected by CR1 upon content subscription or may be generated upon user registration. CR1 may optionally also sign the encrypted content using Sign(pr-c, Enc(k, m)). The encrypted content may then be stored or cached in the CON 410. The encryption key may be uniquely assigned to the user group and may be distributed to CR1 in the CON 410. However, the encryption key may not be shared to other user groups to prevent other user groups from sharing the encrypted content and to maintain groupwise content confidentiality/privacy.

A second customer node/site 450, which may correspond to the same user group of the first customer node/site 450 or to another organization or user group authorized by the user group, may then request the content from CR1 or from a second content router 414 (CR2). CR2 may receive the encryption key k that was used for encrypting the content and decrypt the content using Dec(Enc(k, m)). CR2 may optionally also verify the integrity of the encrypted content using Verify(pb-c, Sign(pr-c, Enc(k, m))), where pb-c is a public key for CR1. The second customer node/site 450 may subscribe the decrypted content with CR2 using SecureSubscribe (name) and verify the integrity of the content using Verify(pr-b, Sign(pr-p, m)), where pr-b is a private key for the subscriber (e.g., the second customer node/site 450).

The functions for secure publishing and secure subscribing may be provided, e.g., as APIs, by the CON 410 to the customer nodes/sites 450. However, the encryption/decryption security functions may not be transparent to the customer nodes/sites 450. The content may be protected for confidentiality during transmission as a security service provided by the CON 410. In the second level security scheme 400, the channels or links between the customer nodes/sites 450 and the content routers 414 may be secured channels. For instance, trust may be established between the content routers 414 and the internal nodes 412 before exchanging the encryption key k. The content routers 414 may exchange the encryption key k over the secured channels. Alternatively, the encryption key may be distributed to the content routers 414 by a centralized authority in the CON 410, such as the a management plane 160. The content encryption may be used to provide protection against passive eavesdropping during content transmissions. The customer nodes/sites 450 may also be authorized before publishing/subscribing content to the CON 410.

Figure 5:
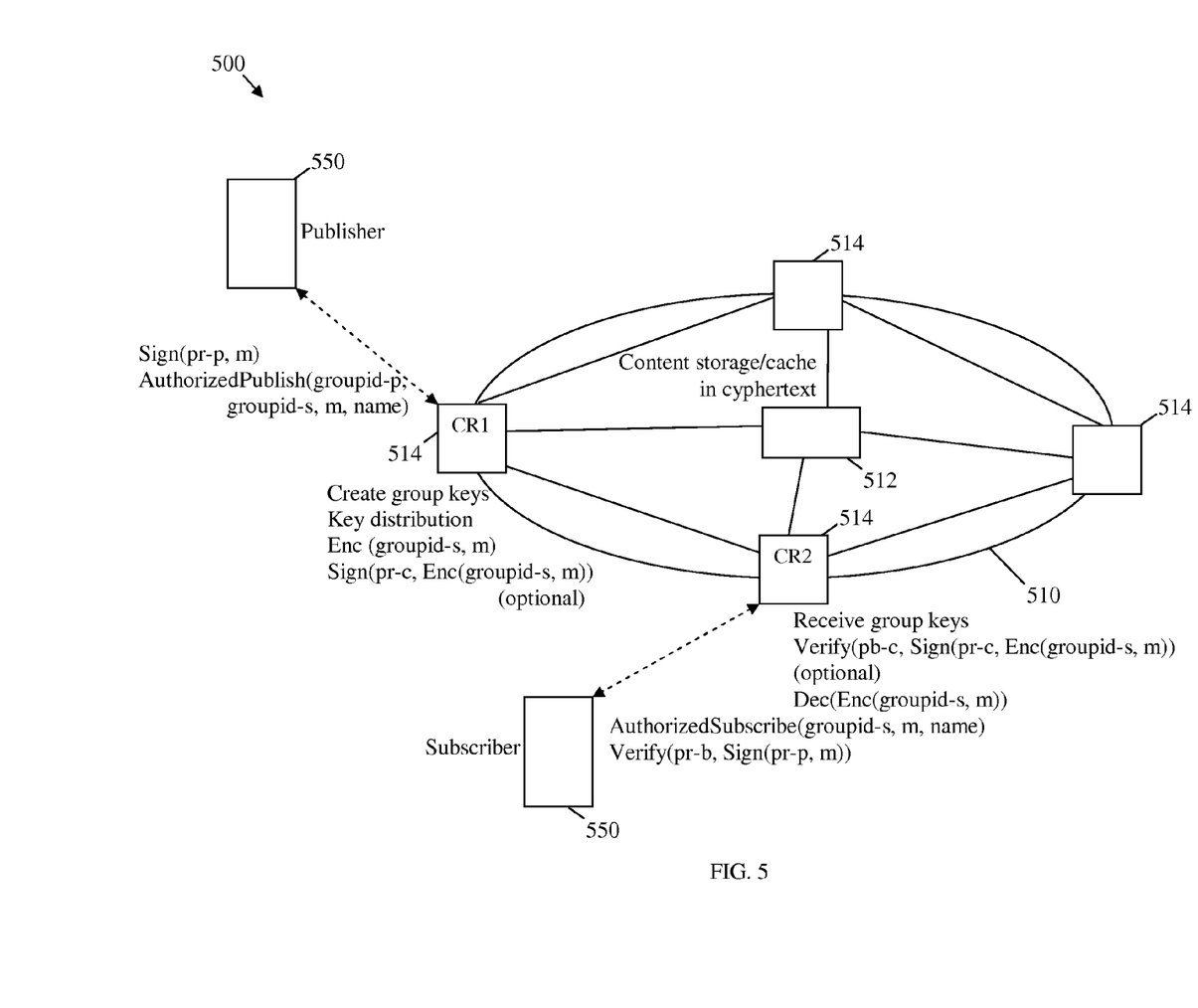
FIG. 5 is a schematic diagram of an embodiment of a third level security scheme.

FIG. 5 illustrates an embodiment of a third level security scheme 500 that may be used to provide data integrity and user group shared content confidentiality/privacy to third level users, e.g., the gold users 272. The third level security scheme 500 may be implemented in a CON 510 to provide improved security features, e.g., in comparison to the first level security scheme 300 and the second level security scheme 400. Specifically, the third level security scheme 500 may provide users content integrity verification, as the first level security scheme 300, and content confidentiality/privacy protection by allowing content encryption/decryption, as the second level security scheme 400. Additionally, the third level security scheme 500 may enable access control, confidentiality, and integrity of content across multiple user groups to enable multiple user group interaction and sharing of content. The CON 510 may comprise a plurality of nodes 512 and content routers 514, which may be configured substantially similar to the internal nodes 512 and the content routers 514, respectively. The content routers 514 may be coupled to a plurality of customer nodes/sites 550, similar to the customer nodes 120/customer sites 150, e.g., via a plurality of access networks (not shown). The customer nodes/sites 550 may be configured to publish/subscribe content in the CON 510.

The third level scheme 500 may use public/private keys, encryption keys, and general cryptographic algorithms or functions, as in the second level security scheme 400. Additionally, the third level scheme 500 may use a set of group IDs for users authorized to publish and subscribe content, such as according to an organization policy. The authorized users may be members of one or multiple user groups, which may be allowed to share publishing/subscribing content.

For instance, a first customer node/site 550 may be a content publisher that publishes content for a user to the CON 510, via a content router 514. The user may belong to one user group that may share content with other user groups or may belong to multiple user groups that share content, such as different Enterprises, organizations, or SNs. The user may sign content using Sign(pr-p, m) and publish the content with a content router 514 using AuthorizedPublish(groupid-p, groupid-s, m, name), where groupid-p is one ID in a set of group IDs (or memberships) for authorized publishers for the content and groupid-s is one ID in a set of group IDs or keys (memberships) for authorized subscribers for the content. The content may be published in original format, e.g., as plaintext. As such, the content router 514 may encrypt the content, e.g. in cyphertext format, using Enc(groupid-s, m), where groupid-s is one ID in a set of group IDs or keys (memberships) for authorized subscribers for the content. The content router 514 may create and distribute a plurality of group keys in the CON 510 to other content routers 414. The content router 514 may optionally also sign the encrypted content using Sign(pr-c, Enc(groupid-s, m)). The encrypted content may then be stored or cached in the CON 510 in cyphertext. The content may be encrypted for each group ID used by a user or user group. Thus, there may be a plurality of encrypted and cached/stored copies of the content in the CON 510.

A second customer node/site 550, which may correspond to any of the user groups associated with the group IDs may then request the content from the same or different content router 514. The content router 514 may receive the encryption group keys that were used for encrypting the content and decrypt the content using Dec(Enc(groupid-s, m)). The content router 514 may optionally also verify the integrity of the encrypted content using Verify(pb-c, Sign(pr-c, Enc(groupid-s, m))). The second customer node/site 550 may subscribe the decrypted content with the content router 514 using AuthorizedSubscribe(groupid-s, m, name) and verify the integrity of the content using Verify(pr-b, Sign(pr-p, m)). The decrypted and subscribed content may be one of multiple encrypted and cached copies of the content for multiple individual group IDs or keys.

The functions for authorized publishing and authorized subscribing may be provided, e.g., as APIs, by the CON 510 to the customer nodes/sites 550. However, the encryption/decryption security functions may not be transparent to the customer nodes/sites 550. The user groups, such as customer organizations, that share content may define their own policies on which users may publish/subscribe content and access information securely in their user groups. This scheme may provide finer grained content access control than the second level security scheme 400. The third level security scheme 500 may also have the same trust relations among the components/channels of the CON 510 as the second level security scheme 400.

Figure 6:
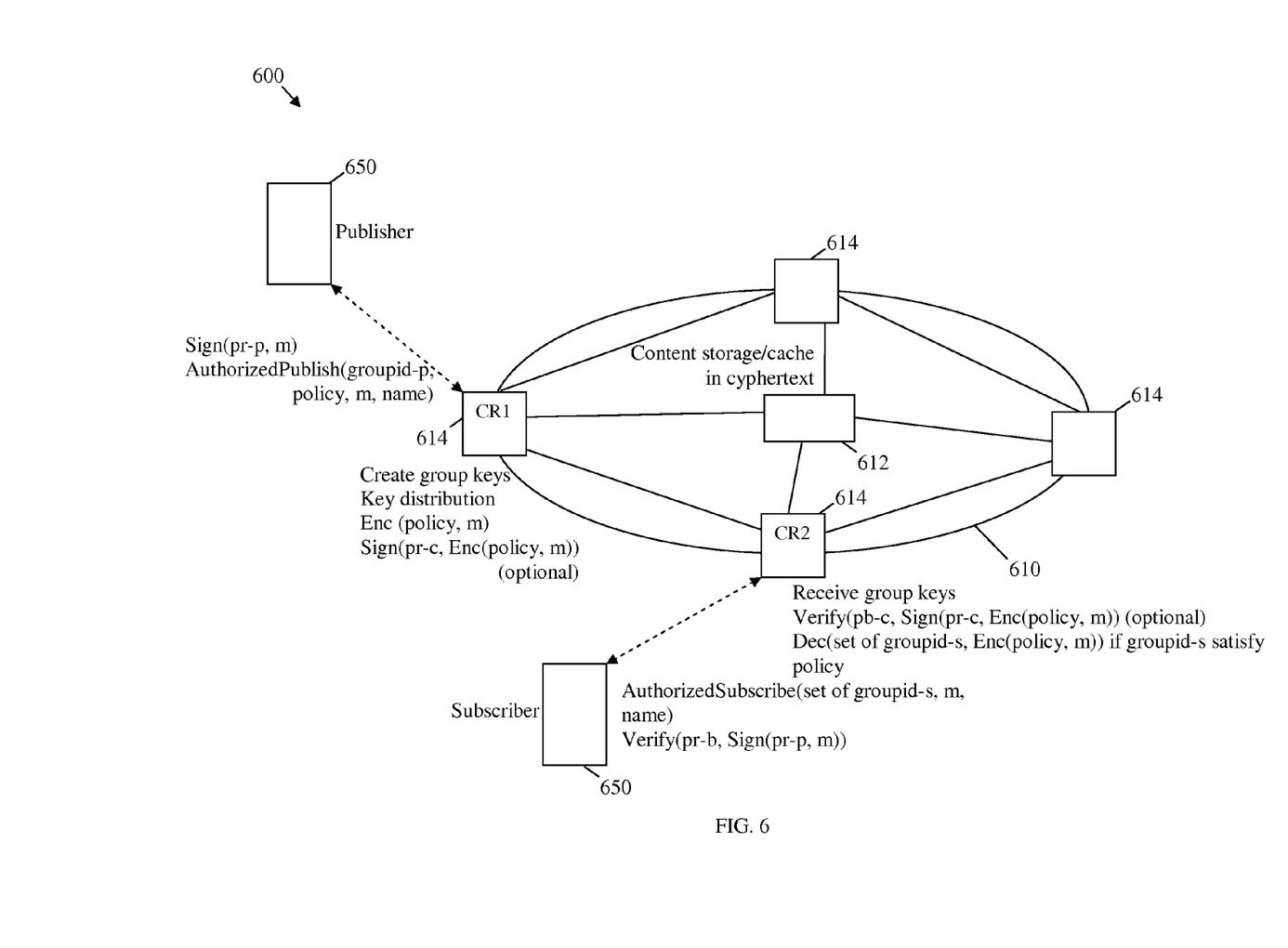
FIG. 6 is a schematic diagram of another embodiment of a third level security scheme.

FIG. 6 illustrates an embodiment of another third level security scheme 600 that may be used to provide data integrity and user group shared content confidentiality/privacy to third level users, e.g., the gold users 272. The third level security scheme 600 may be implemented in a CON 610 to provide improved security features, e.g., with respect to the first level security scheme 300 and the second level security scheme 400. The third level security scheme 600 may provide users content integrity verification and content confidentiality/privacy protection that is shared among multiple user groups, as the third level security scheme 500. However, the third level security scheme 600 may require encrypting the shared content one time instead of multiple times for each authorized user group access. The encrypted content may be accessed by users based on their authorized group memberships. The CON 610 may comprise a plurality of nodes 612 and content routers 614, which may be configured substantially similar to the internal nodes 612 and the content routers 614, respectively. The content routers 614 may be coupled to a plurality of customer nodes/sites 650, similar to the customer nodes 120/customer sites 150, e.g., via a plurality of access networks (not shown). The customer nodes/sites 650 may be configured to publish/subscribe content in the CON 610.

For instance, a first customer node/site 650 may be a content publisher that publishes content for a user to the CON 610, via a first content router 614 (CR1). The user may belong to one user group that may share content with other user groups or may belong to multiple user groups that share content, such as different Enterprises, organizations, or SNs. The user may sign content using Sign(pr-p, m) and publish the content with CR1 using AuthorizedPublish(groupid-p, policy, m, name), e.g., as plaintext. CR1 may then encrypt the content, e.g. in cyphertext format, using Enc(policy, m), where policy is a logical formula based on group memberships that indicates user/user groups or members authorized to share content. For example, a policy set to (group1 AND group2) OR group3 may indicate that content may be shared (e.g., published and subscribed) by a user that is both a member of a first user group (group1) and a second user group (group2) or that is a member of a third user group (group3). CR1 may create group keys for the content and distribute the keys in the CON 510 to other content routers 614. CR1 may optionally also sign the encrypted content using Sign(pr-c, Enc(policy, m)). The encrypted content may then be stored or cached in the CON 510 in cyphertext. The encrypted content may be authorized for any user that satisfies the indicated policy.

A second customer node/site 650, which may correspond to any of the user groups indicated in the policy may then request the content from CR1 or a second content router 614 (CR2). CR2 may receive the encryption group keys that were used for encrypting the content and decrypt the content using Dec(set of groupid-s, Enc(policy, m)), where set of groupid-s is a set of group IDs for authorized subscribers of the content that satisfy the policy. A subscriber may belong to a plurality of groups and may have a plurality of corresponding group IDs. CR2 may optionally also verify the integrity of the encrypted content using Verify(pb-c, Sign(pr-c, Enc(policy, m))). The second customer node/site 650 may subscribe the decrypted content with CR2 using AuthorizedSubscribe(set of groupid-s, m, name) and verify the integrity of the content using Verify(pr-b, Sign(pr-p, m)). A single cached or stored copy of the content in the CON 610 may be used for multiple publishers/subscribers that satisfy the policy, which may improve the efficiency/scalability of the third level security scheme 600, e.g., in comparison to the third level security scheme 500 since less content may be cached.

In the third level security scheme 600, the user groups authorized for sharing content may not be registered with each content router 614. For instance, a first subset of authorized user groups may be registered with some of the content routers 614 and a second subset of authorized user groups may be registered with other content routers 614. In this case, a content request from a user may be forwarded to a central authority to determine which closest content router 614 may be capable of resolving the request for the user, which may be a different content router 614 that is not registered to the user or his user group. Further, each user or user group may have its own organization policies and enforcements. For example, the groupid-p in AuthorizedPublish( ) and the groupid-s in AuthorizeSubscribe( ) may be obtained after implementing an organization's authorization policy, which may group multiple authorized publishers with multiple authorized subscribers for content. The third level security scheme 600 may also have the same trust relations among the components/channels of the CON 610 as the second level security scheme 400.

In the group-based schemes above, e.g., the third level security schemes 500 and 600, a plurality of crypto mechanisms may be used to implement the group-based encryption and decryption algorithms to satisfy the requirements in the CON. In one embodiment, the CON (or content router) may generate symmetric group keys for individual user groups. A content that belongs to multiple user groups may be encrypted with different group keys, e.g., for different user groups. In another embodiment, the CON may use an attribute-based encryption where each groupid is an attribute, such as described in http://acsc.cs.utexas.edu/ and http://www.cs.berkeley.edu/~bethenco/oakland07cpabe.pdf, both of which are incorporated herein by reference. As such, when a content is published, the CON may include the policy as part of the cached or stored meta data. The policy may indicate what user groups are allowed to access the content. When the CON delivers the content to a user, the CON nodes (e.g., content routers) may decrypt the content based on the subscriber's group memberships.

The security schemes described above may be extended and customized for multiple levels of security services upon customer requirements. For instance, the third level security schemes 500 or 600 may be further improved using the schemes and methods described in U.S. Provisional Patent Application No. 61/493,679 filed Jun. 6, 2011 by Guoqiang Wang et al. and entitled "Method for Router Enforced Content Access Control with Context-Supervised Subscriber Information in Content Oriented Network," which is incorporated herein by reference as if reproduced in its entirety. Additional security levels may also be used that comprise the methods in the security schemes above. For instance, a fourth level security scheme may be implemented based on the methods above and on the schemes and methods described in U.S. Provisional Patent Application No. 61/493,679. A fifth level security scheme may also be implemented based on the methods above and on the schemes and methods described in U.S. Patent Application No. 61/423,947, filed Dec. 16, 2010 by Ravi Ravindran, et al. and entitled "Method and Apparatus to Create and Manage Virtual Private Groups in a Content Oriented Network", which is incorporated herein by reference as if reproduced in its entirety. The methods in the schemes above may be implemented to support a plurality of control and forwarding plane functions to enable security differentiation over content VPN services, as described in U.S. Patent Application No. 61/423,947.

Figure 7:
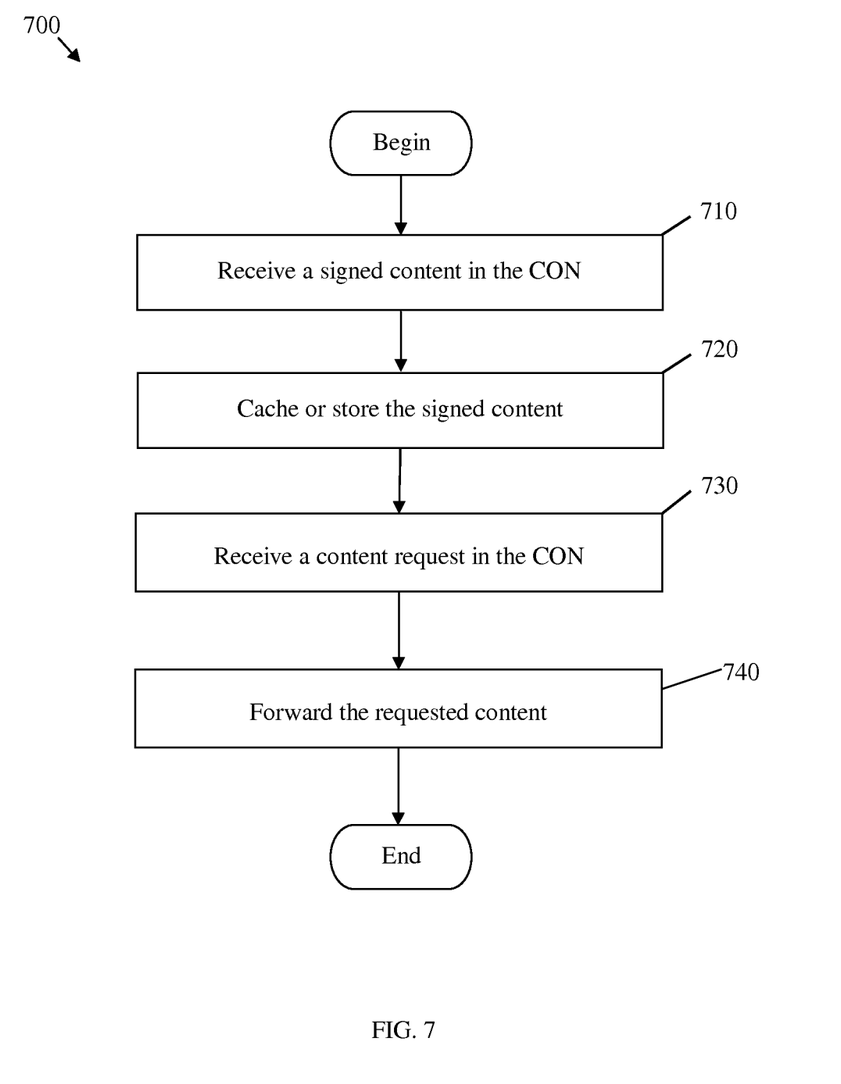
FIG. 7 is a flowchart of an embodiment of a CON security method.

FIG. 7 illustrates an embodiment of a CON security method 700 that may be used to provide content integrity and confidentiality. The CON security method may be implemented by a CON, a central authority of the CON, one or more content routers, or combinations thereof. The CON security method 700 may be based on any of the security level schemes described above, e.g., based on a user or user group classification, one of the mode of operations described above, or both. The method 700 may begin at block 710, where a signed content may be received in the CON, e.g., by a content router. The received content may be signed and published by a user or publisher. The user or publisher may correspond to one or more user groups and may sign the content using pr-p. The content may published without ensuring confidentiality by the CON, securely published to ensure confidentiality, or securely published for authorized user groups (using groupid-s).

At block 720, the signed content may be cached/stored in the CON. The content may be encrypted before caching/storing e.g., by the content router. The content may be encrypted using an encryption key k, a groupid-s, or a policy. The encrypted content may also be signed using pr-c. At block 730, a content request may be received in the CON, e.g., by the same or a second content router. The content may be received from a user or subscriber in the same user group or another user group authorized to obtain the content. At block 740, the requested content may be forwarded. The content router may forward the cached/stored content to the subscriber. If the cached/stored content is encrypted, then the content router may decrypt the content using the encryption key k or groupid-s. The subscriber and optionally the content router may also verify the content before obtaining the content. The method 700 may then end.

Figure 8:
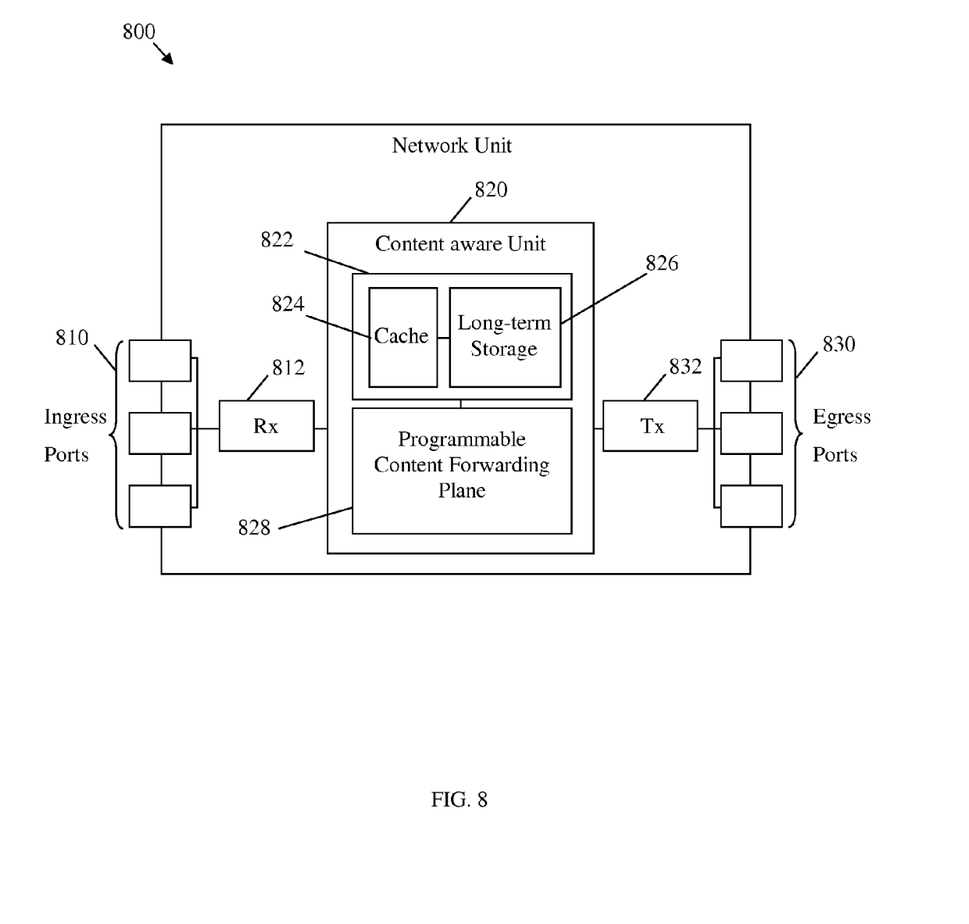
FIG. 8 is a schematic diagram of an embodiment of a network unit.

FIG. 8 illustrates an embodiment of a network unit 800, which may be any device that transports and processes data through a network. For instance, the network unit 800 may be located in the content router or any node in the CON 100, or any node in the CON schemes described above. The content router may also be configured to implement or support the CON systems and methods described above. The network unit 800 may comprise one or more ingress ports or units 810 coupled to a receiver (R8) 812 for receiving signals and frames/data from other network components. The network unit 800 may comprise a content aware unit 820 to determine which network components to send content to. The content aware unit 820 may be implemented using hardware, software, or both. The network 800 may also comprise one or more egress ports or units 830 coupled to a transmitter (T8) 832 for transmitting signals and frames/data to the other network components. The receiver 812, content aware unit 820, and transmitter 832 may also be configured to implement at least some of the disclosed methods, which may be based on hardware, software, or both. The components of the network unit 800 may be arranged as shown in FIG. 8.

The content aware unit 820 may also comprise a programmable content forwarding plane block 828 and one or more storage blocks 822 that may be coupled to the programmable content forwarding plane block 828. The programmable content forwarding plane block 828 may be configured to implement content forwarding and processing functions, such as at an application layer or L3, where the content may be forwarded based on content name or prefi8 and possibly other content related information that maps the content to network traffic. Such mapping information may be maintained in a content table at the content aware unit 820 or the network unit 800. The programmable content forwarding plane block 828 may interpret user requests for content and accordingly fetch content, e.g., based on metadata and/or content name, from the network or other content routers and may store the content, e.g., temporarily, in the storage blocks 822. The programmable content forwarding plane block 828 may then forward the cached content to the user. The programmable content forwarding plane block 828 may be implemented using software, hardware, or both and may operate above the IP layer or L2. The storage blocks 822 may comprise a cache 824 for temporarily storing content, such as content that is requested by a subscriber. Additionally, the storage blocks 822 may comprise a long-term storage 826 for storing content relatively longer, such as content submitted by a publisher. For instance, The cache 824 and the long-term storage 826 may include Dynamic random-access memories (DRAMs), solid-state drives (SSDs), hard disks, or combinations thereof.

Figure 9:
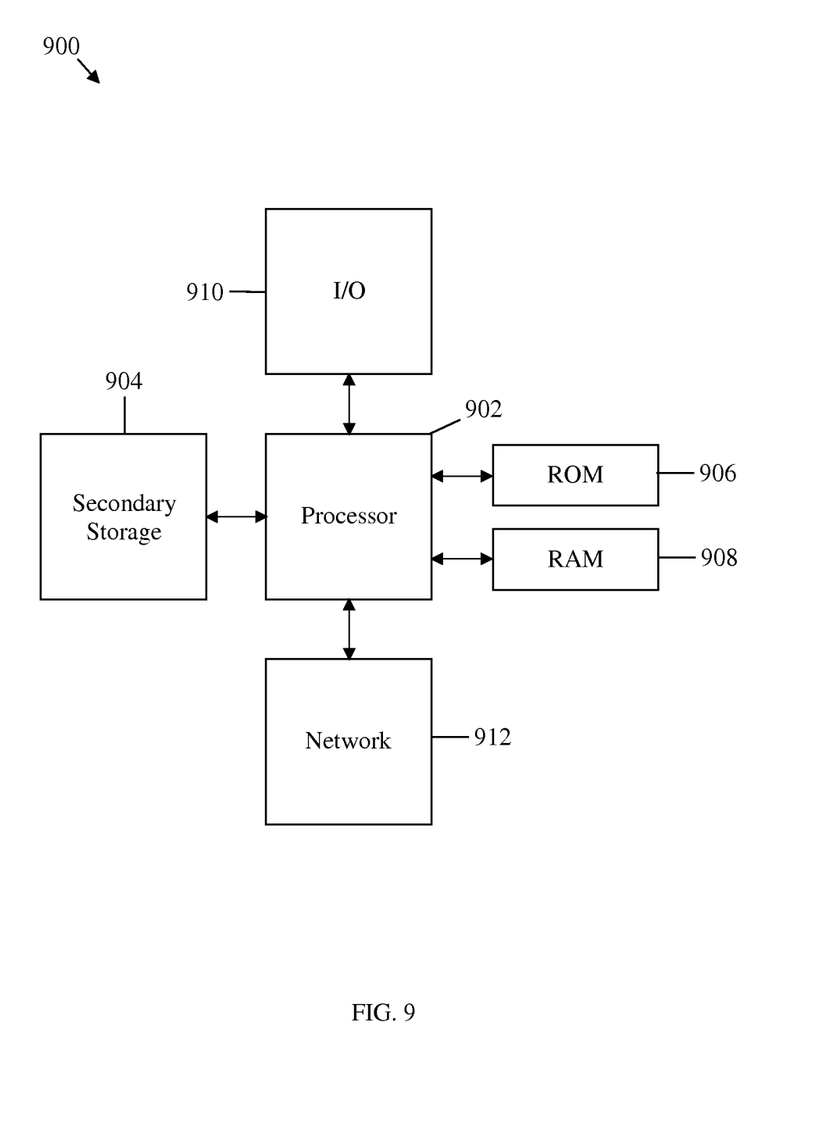
FIG. 9 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 9 illustrates a typical, general-purpose network component 900 suitable for implementing one or more embodiments of the components disclosed herein. The network component 900 includes a processor 902 (which may be referred to as a central processor unit or CPU) that is in communication with memory devices including secondary storage 904, read only memory (ROM) 906, random access memory (RAM) 908, input/output (I/O) devices 910, and network connectivity devices 912. The processor 902 may be implemented as one or more CPU chips, or may be part of one or more application specific integrated circuits (ASICs).

The secondary storage 904 is typically comprised of one or more disk drives or tape drives and is used for non-volatile storage of data and as an over-flow data storage device if RAM 908 is not large enough to hold all working data. Secondary storage 904 may be used to store programs that are loaded into RAM 908 when such programs are selected for execution. The ROM 906 is used to store instructions and perhaps data that are read during program execution. ROM 906 is a non-volatile memory device that typically has a small memory capacity relative to the larger memory capacity of secondary storage 904. The RAM 908 is used to store volatile data and perhaps to store instructions. Access to both ROM 906 and RAM 908 is typically faster than to secondary storage 904.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network device in a Content Oriented Network (CON), wherein the network device comprises:
    a receiver configured to receive, from a publisher, a plain text content item signed by a publisher private key and an associated security information, wherein the security information comprises a group identifier (ID) that uniquely identifies a group of subscribers that is authorized to access the content item;
    a processor coupled to the receiver and configured to implement procedures to enforce security policies defined by the security information, wherein the procedures comprise:
        encrypting the plain text content item at the network device using the group ID as an encryption key to produce an encrypted content item;
        attempting to decrypt the content item in response to a request from a subscriber by employing a subscriber group ID as a decryption key;
        granting the subscriber access to the content item when the subscriber group ID successfully decrypts the content item; and
        verifying the content item on behalf of the subscriber by employing a publisher public key;
    a storage unit coupled to the processor and configured to cache the encrypted content item and the associated security information; and
    a transmitter coupled to the processor and configured to:
        send the content item from the storage unit to the subscriber when the subscriber is granted access; and
        distribute the group ID among a plurality of content routers in the CON to support distributed access to the encrypted content item.

2. The network device of claim 1, wherein the network device is further configured to receive a second content item from a content router in the CON, wherein the second content item is encrypted when received, wherein the second content item is signed by the content router using a private content router key, and wherein the processor is further configured to verify the second content item using a public content router key before sending the second content item to a second subscriber.

3. The network device of claim 2, wherein the second content item is decrypted before sending the second content item to the second subscriber.

4. The network device of claim 1, wherein encrypting the plain text content item using the group ID further comprises using a second group ID as part of the encryption key, wherein the second group ID is associated with a user group that authorized to share and subscribe the encrypted content item.

5. A content router comprising:
a receiver configured to receive a content item in plain text and an associated security policy from a publisher in a content oriented network (CON), wherein the content item is signed by the publisher, and wherein the security policy comprises a logical group membership formula that indicates user group membership requirements for authorization to access the content item;
a hardware processor coupled to the receiver and a storage unit, wherein the hardware processor is configured to:
 encrypt the plain text content item using the logical group membership formula as a security key to produce an encrypted content item;
 distribute the logical group membership formula among a plurality of content routers in the CON to support distributed access to the encrypted content item;
 store the encrypted content item in the storage unit;
 receive, via the receiver, an access request from a user, wherein the access request comprises one or more group membership identifiers (IDs) associated with the user;
 attempt to decrypt the encrypted content item with the user's group membership IDs;
 grant the user access to the content item when the user's group membership IDs successfully decrypt the content item.

6. The content router of claim 5, wherein the security policy defines a plurality of security levels for a plurality of user classes.

7. The content router of claim 6, wherein the storage unit is configured to store a plurality of security policies, and wherein the plurality of security policies define a plurality of user security levels.

8. The content router of claim 7, wherein the user is associated with one of a plurality of user classes that each have a plurality of corresponding security levels provided by the CON, and wherein the security levels comprise a first security level for guaranteeing content integrity, a second security level for guaranteeing content integrity and confidentiality, and a third security level for guaranteeing content integrity, confidentiality, and sharing among multiple authorized user groups.

9. The content router of claim 8, wherein the security levels are implemented based on a plurality of CON operation models, and wherein the CON operation models comprise a first operation model where the content router provides content integrity and not content confidentiality, a second operation model where the content router shares provisioning of content integrity and confidentiality with the user group, and a third operation model where the content router handles both content integrity and confidentiality.

10. The content router of claim 5, wherein the security policy enables privacy protection, wherein the security policy is employed to support confidentiality of the content item, wherein the security policy provides access control to the content item, and wherein the security policy is employed to support an integrity of the content item.

11. The content router of claim 5, wherein the user is associated with at least one of a security policy, a service level agreement (SLA), and a Quality of Service (QoS) requirement.

12. The content router of claim 5, wherein the content router is further configured to provide a plurality of application programming interfaces (APIs) for publishing and subscribing the content item, and wherein the content router uses a plurality of functions for encrypting and decrypting the content item which are transparent to the users.

13. A method implemented in a network device in a content oriented network (CON), the method comprises:
 receiving, from a publisher, a plain text content item signed by a publisher private key and an associated security information, wherein the security information comprises a group identifier (ID) that uniquely identifies a group of subscribers that is authorized to access the content item;
 encrypting, by a computing device, the plain text content item using the group ID as an encryption key to produce an encrypted content item;
 caching the encrypted content item;
 distributing the group ID among a plurality of content routers in the CON to support distributed access to the encrypted content item;
 attempting to decrypt the content item in response to a request from a subscriber by employing a subscriber group ID as a decryption key;
 granting the subscriber access to the content item when the subscriber group ID successfully decrypts the content item; and
 verifying the content item on behalf of the subscriber by employing a publisher public key;
 sending the content item to the subscriber when the subscriber is granted access.

14. The method of claim 13, further comprising:
 receiving a second content item from a content router in the CON, wherein the second content item is signed by the content router using a private content router key; and
 verifying the second content item using a public content router key before sending the second content item to a second subscriber.

15. The method of claim 14, wherein the second content item is encrypted when received, and wherein the method further comprises:
 receiving a second group ID associated with the second content item from the content router;
 attempting to decrypt the second content item in response to a request from a second subscriber by employing a second subscriber group ID as a decryption key;
 granting the second subscriber access to the second content item when the second subscriber group ID successfully decrypts the second content item.

16. The method of claim 15, further comprising forwarding the decrypted second content item to the second subscriber in plain text when the second subscriber is granted access.

17. The method of claim 13, wherein encrypting the plain text content item using the group ID further comprises using a third group ID as part of the encryption key, wherein the third group ID is associated with a user group that authorized to share and subscribe the encrypted content item.

* * * * *